(12) United States Patent
Kuang et al.

(10) Patent No.: US 11,792,828 B2
(45) Date of Patent: Oct. 17, 2023

(54) RESOURCE ALLOCATION METHOD, FIRST DEVICE, AND SECOND DEVICE

(71) Applicant: Huawei Technologies Co., Ltd., Shenzhen (CN)

(72) Inventors: Yiru Kuang, Beijing (CN); Haibo Xu, Beijing (CN); Nathan Edward Tenny, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/637,191

(22) PCT Filed: Aug. 9, 2017

(86) PCT No.: PCT/CN2017/096596
§ 371 (c)(1),
(2) Date: Feb. 6, 2020

(87) PCT Pub. No.: WO2019/028694
PCT Pub. Date: Feb. 14, 2019

(65) Prior Publication Data
US 2020/0374864 A1 Nov. 26, 2020

(51) Int. Cl.
*H04W 72/51* (2023.01)
*H04W 8/26* (2009.01)
(Continued)

(52) U.S. Cl.
CPC ............ *H04W 72/51* (2023.01); *H04W 8/26* (2013.01); *H04W 72/044* (2013.01);
(Continued)

(58) Field of Classification Search
None
See application file for complete search history.

(56) References Cited

U.S. PATENT DOCUMENTS 11,438,842 B2 * 9/2022 Zhao ............... H04W 76/10
2014/0328329 A1 * 11/2014 Novlan ........... H04W 56/0015
370/336

(Continued)

FOREIGN PATENT DOCUMENTS

CN 103490859 A 1/2014
CN 104811892 A 7/2015
(Continued)

OTHER PUBLICATIONS

R2-154309, Fujitsu Limited, "Resource allocation for the remote UE and the relay UE," 3GPP TSG-RAN WG2 Meeting#91 bis, Malmo, Sweden, Oct. 5-9, 2015, 2 pages.
(Continued)

*Primary Examiner* — Srinivasa R Reddivalam
(74) *Attorney, Agent, or Firm* — Conley Rose, P.C.

(57) ABSTRACT

A resource allocation method includes sending, by the first device, a first message to the second device, where the first message is used to request a sidelink resource for the first device to send data to a third device, and the first message includes first identification information of the third device. The method further includes receiving, by the first device, a second message sent by the second device, where the second message is used to indicate a target sidelink resource for the first device to send the data to the third device. The method further includes using, by the first device, the target sidelink resource to send the data to the third device.

17 Claims, 4 Drawing Sheets

(51) Int. Cl.
*H04W 72/044* (2023.01)
*H04W 72/21* (2023.01)
*H04W 72/23* (2023.01)
*H04W 88/04* (2009.01)

(52) U.S. Cl.
CPC .......... *H04W 72/21* (2023.01); *H04W 72/23* (2023.01); *H04W 88/04* (2013.01)

(56) References Cited

U.S. PATENT DOCUMENTS

| | | | |
|---|---|---|---|
| 2016/0044678 A1* | 2/2016 | Kwon | H04W 72/0453 370/329 |
| 2016/0073408 A1 | 3/2016 | Sartori et al. | |
| 2016/0183241 A1* | 6/2016 | Lee | H04W 56/0015 455/425 |
| 2016/0338095 A1 | 11/2016 | Faurie et al. | |
| 2017/0094656 A1 | 3/2017 | Chen et al. | |
| 2017/0127251 A1 | 5/2017 | Yi et al. | |
| 2017/0171837 A1 | 6/2017 | Chen et al. | |
| 2017/0181177 A1 | 6/2017 | Lunttila et al. | |
| 2017/0230941 A1 | 8/2017 | Agiwal et al. | |
| 2017/0257876 A1* | 9/2017 | Loehr | H04L 5/0044 |
| 2018/0014345 A1 | 1/2018 | Sartori et al. | |
| 2018/0199312 A1* | 7/2018 | Wu | H04W 72/02 |
| 2019/0037621 A1* | 1/2019 | Feng | H04W 76/14 |
| 2019/0059096 A1* | 2/2019 | Wang | H04W 72/1268 |
| 2019/0124651 A1* | 4/2019 | Xu | H04W 76/20 |
| 2020/0336193 A1* | 10/2020 | Park | H04B 7/0695 |

FOREIGN PATENT DOCUMENTS

| | | |
|---|---|---|
| CN | 104954976 A | 9/2015 |
| CN | 106304351 A | 1/2017 |
| CN | 106304366 A | 1/2017 |
| CN | 106454687 A | 2/2017 |
| CN | 106717091 A | 5/2017 |
| CN | 106792890 A | 5/2017 |
| CN | 106797635 A | 5/2017 |
| CN | 108464048 A | 8/2018 |
| WO | 2013049566 A1 | 4/2013 |
| WO | 2016182375 A1 | 11/2016 |
| WO | 2017000373 A1 | 1/2017 |
| WO | 2017049595 A1 | 3/2017 |
| WO | 2017065680 A1 | 4/2017 |
| WO | 2017099595 A1 | 6/2017 |

OTHER PUBLICATIONS

R2-161072, Huawei, et al., "Discussion on Multiple Relay UE IDs for a Relay UE," 3GPP TSG-RAN WG2 Meeting #93, Malta, Feb. 15-19, 2016, 5 pages.

Interdigital et al., "Clean up and corrections for eD2D," 3GPP TSG-RAN WG2 Meeting #93, R2-161797, St. Julian s, Malta, Feb. 15-19, 2016, 18 pages.

Tenny, N., "Further Enhancements LTE Device to Device, UE to Network Relays for IoT and Wearables," 3GPP TSG RAN meeting #76, RP-171071, West Palm Beach, Florida, USA, Jun. 5-8, 2017, 3 pages.

* cited by examiner

| | | | | | | | | |
|---|---|---|---|---|---|---|---|---|
| Local identifier 1 | | | | | | | | Oct 1 |
| LCG ID₁ | Buffer 1 | | | | | | | Oct 2 |
| Local identifier 2 | | | | | | | | Oct 3 |
| LCG ID₂ | Buffer 2 | | | | | | | Oct 4 |

...

| Local identifier N | | Oct 1.5 * N |
|---|---|---|
| LCG ID_N | Buffer N | Oct 1.5 * N+1 |

FIG. 3a

| | | | | | | | |
|---|---|---|---|---|---|---|---|
| Local identifier 1 | | | | | | | Oct 1 |
| Buffer #0 | | | | Buffer #1 | | | Oct 2 |
| Buffer #1 | | | Buffer #2 | | | | Oct 3 |
| Buffer #2 | | Buffer #3 | | | | | Oct 4 |

...

| Local identifier N | | | Oct 4 * N−3 |
|---|---|---|---|
| Buffer #0 | | Buffer #1 | Oct 4 * N−2 |
| Buffer #1 | Buffer #2 | | Oct 4 * N−1 |
| Buffer #2 | Buffer #3 | | Oct 4 * N |

RESOURCE ALLOCATION METHOD, FIRST DEVICE, AND SECOND DEVICE

CROSS-REFERENCE TO RELATED APPLICATIONS

This application is a national stage of International Patent Application No. PCT/CN2017/096596, filed on Aug. 9, 2017, which is hereby incorporated by reference in its entirety.

TECHNICAL FIELD

The present invention relates to the field of communications technologies, and in particular, to a resource allocation method, a first device, and a second device.

BACKGROUND

A device-to-device (Device-to-Device, D2D) communication mode is a communication mode in which a transmit end directly sends data to a receive end through a sidelink, without a need to forward the data by using an evolved NodeB (Evolved NodeB, eNB) or a cellular network. A relatively special mode in the D2D communication mode is that remote (remote) user equipment (User Equipment, UE) connects to a network device by using another relay user equipment relay UE with a relay function. This scenario is referred to as UE-to-Network relay.

In the UE-to-Network relay scenario, a resource allocation manner for relay UE in an RRC connected mode is a resource allocation manner in which scheduling is performed by using a base station. When needing to send data to a plurality of remote UEs, the relay UE sends a sidelink buffer status report (sidelink Buffer Status Reporting, BSR) to an eNB. The BSR is used to request a plurality of sidelink resources. The eNB allocates a plurality of sidelink resources to the relay UE by using sidelink grants. The relay UE selects the sidelink resources based on priorities of sidelink data to be sent to different remote UEs. This manner does not specifically allocate a sidelink resource for remote UE, and consequently the remote UE may not receive the data, for example, because a selected sidelink resource is not within a range of resources listened on by the remote UE.

SUMMARY

The embodiments of the present invention provide a resource allocation method, a first device, and a second device, and can ensure that a third device can receive sent data, thereby preventing a loss of a data packet.

According to a first aspect, an embodiment of the present invention provides a resource allocation method that may be applied to a communications system. Optionally, the communications system may be a D2D system. The communications system includes a first device, a second device, and a third device. The first device may be relay user equipment in the D2D communications system, the second device may be a network device in the D2D communications system, and the third device may be remote user equipment in the D2D communications system. Optionally, the first device sends a first message to the second device. The first message is used to request a sidelink resource for the first device to send data to a third device, and the first message includes first identification information of the third device.

The first device receives a second message sent by the second device. The second message is used to indicate a target sidelink resource for the first device to send the data to the third device.

The first device uses the indicated target sidelink resource to send the data to the third device.

Optionally, the first identification information is used by the second device to determine configuration information of the third device. Optionally, the configuration information is used to indicate a resource on which the third device cannot receive data. It should be noted that the resource on which the third device cannot receive data means that the third device cannot receive data on a location of the resource, for example, the third device does not listen for, on the location of the resource, data carried on the resource.

The target sidelink resource is a resource allocated by the second device based on the configuration information of the third device, that is, the target sidelink resource does not include the resource on which the third device cannot receive data.

Optionally, the first message further includes an indication field. The indication field is used to indicate a quantity of logical channel groups of the third device.

Optionally, the first identification information is a local identifier of the third device or a destination address index value of the third device.

Optionally, if the first identification information is the destination address index value of the third device, before the first device sends the first message to the second device, the method further includes:

The first device sends an information table to the second device. The information table includes a local identifier list of the third device or a cell radio network temporary identifier list of the third device. Optionally, by using the destination address index value of the third device that is included in the first message, the corresponding third device can be identified from the local identifier list or the cell radio network temporary identifier list. It should be noted that the information table may be set separately, or content of the information table may be merged into a destination address information table. The destination address index value indicates a specific identifier in the information table.

Optionally, the second message includes second identification information of the third device. In other words, the second device notifies the first device that the target sidelink resource is allocated to the third device identified by the second identification information, so that the first device can use the target sidelink resource to send the data to the third device identified by the second identification information.

Optionally, the second identification information of the third device is the local identifier of the third device or the destination address index value of the third device.

Optionally, the second message is downlink control information scrambled by using a cell radio network temporary identifier of the third device.

Optionally, before the first device selects the target sidelink resource to send the data to the third device, the first device may also obtain the configuration information of the third device from the second device. Optionally, the configuration information is used to indicate a resource on which the third device cannot receive data. It should be noted that the resource on which the third device cannot receive data means that the third device cannot receive data on a location of the resource, for example, the third device does not listen for, on the location of the resource, data carried on the resource.

The first device uses, based on the configuration information, the target sidelink resource on which the third device is capable of listening, to send the data to the third device. It should be noted that the target sidelink resource on which the third device is capable of listening means that the third device can listen for data carried on the target sidelink resource from a location of the target sidelink resource.

According to a second aspect, an embodiment of the present invention provides a resource allocation method. The resource allocation method may be applied to a communications system. Optionally, the communications system may be a D2D) system. The communications system includes a first device, a second device, and a third device. The first device may be relay user equipment in the D2D communications system, the second device may be a network device in the D2D communications system, and the third device may be remote user equipment in the D2D communications system. Optionally, the second device receives a first message sent by the first device. The first message is used to request allocation of a sidelink resource for the first device to send data to a third device, and the first message includes first identification information of the third device.

The second device sends a second message to the first device. The second message is used to indicate a target sidelink resource for the first device to send the data to the third device.

Optionally, the first identification information is used by the second device to determine configuration information of the third device; and the target sidelink resource is a resource allocated based on the configuration information of the third device.

Optionally, the first message further includes an indication field. The indication field is used to indicate a quantity of logical channel groups of the third device.

Optionally, the first identification information is a local identifier of the third device or a destination address index value of the third device.

Optionally, if the first identification information is the local identifier, that the second device obtains configuration information of the third device identified by the first identification information includes:

The second device determines a cell radio network temporary identifier associated with the local identifier, where the cell radio network temporary identifier is used by the second device to identify the third device; and the second device obtains configuration information corresponding to the cell radio network temporary identifier.

Optionally, if the first identification information is the destination address index value of the third device, that the second device obtains configuration information of the third device identified by the first identification information includes:

The second device determines a cell radio network temporary identifier associated with the destination address index value, where the cell radio network temporary identifier is used by the second device to identify the third device; and the second device obtains configuration information corresponding to the cell radio network temporary identifier.

Optionally, before the second device receives the first message sent by the first device, the method further includes:

The second device saves a correspondence between a proximity service user equipment identifier of the third device and either the local identifier of the third device or a cell radio network temporary identifier of the third device; or the second device receives an information table sent by the first device, where the information table includes a local identifier list of the third device or a cell radio network temporary identifier list of the third device.

It should be noted that the information table may be set separately, or content of the information table may be merged into a destination address information table. If the second device saves the correspondence between the proximity service user equipment identifier of the third device and either the local identifier of the third device or the cell radio network temporary identifier of the third device, the destination address index value indicates a specific identifier in the destination address information table. Alternatively, if the second device receives the information table sent by the first device, where the information table includes the local identifier list of the third device or the cell radio network temporary identifier list of the third device, the destination address index value indicates a specific identifier in the information table.

Optionally, the second message includes the second identification information of the third device. In other words, the second device notifies the first device that the target sidelink resource is allocated to the third device identified by the second identification information, so that the first device can use the target sidelink resource to send the data to the third device identified by the second identification information.

Optionally, the second identification information of the third device is the local identifier of the third device or the destination address index value of the third device.

Optionally, the second message is downlink control information scrambled by using the cell radio network temporary identifier of the third device.

According to a third aspect, an embodiment of the present invention provides a first device. The first device includes a transceiver unit and a processing unit. The transceiver unit is configured to send a first message to a second device. The first message is used to request a sidelink resource for the first device to send data to a third device, and the first message includes first identification information of the third device.

The processing unit is configured to receive a second message sent by the second device. The second message is used to indicate a target sidelink resource for the first device to send the data to the third device.

The transceiver unit is further configured to use the target sidelink resource to send the data to the third device.

According to a fourth aspect, an embodiment of the present invention provides a first device. The first device includes a transceiver, a processor, and a memory. The memory is configured to store an instruction. The processor is configured to execute the instruction stored in the memory. When the processor executes the instruction stored in the memory, the first device is configured to complete the method according to the first aspect.

According to a fifth aspect, an embodiment of the present invention provides a second device. The second device includes a transceiver unit and a processing unit. The transceiver unit is configured to receive a first message sent by a first device. The first message is used to request allocation of a sidelink resource for the first device to send data to a third device, and the first message includes first identification information of the third device.

The transceiver unit is further configured to send a second message to the first device. The second message is used to indicate a target sidelink resource for the first device to send the data to the third device. The target sidelink resource is a resource allocated to the third device based on the first identification information.

According to a sixth aspect, an embodiment of the present invention provides a second device. The second device includes a transceiver, a processor, and a memory. The memory is configured to store an instruction. The processor is configured to execute the instruction stored in the memory. When the processor executes the instruction stored in the memory, the first device is configured to complete the method according to the second aspect.

In the embodiments of the present invention, the first device sends the first message to the second device, and the first identification information included in the first message is an identifier that can be identified by the second device, so that the second device can specifically allocate, based on the third device identified by the first identification information, the target sidelink resource for the first device to send the data to the third device. The first device uses the target sidelink resource to send the data, and this can ensure that the third device can receive the sent data, thereby preventing a loss of a data packet.

BRIEF DESCRIPTION OF DRAWINGS

To describe the technical solutions in the embodiments of the present invention or in the background more clearly, the following describes the accompanying drawings required for describing the embodiments of the present invention or the background.

DESCRIPTION OF EMBODIMENTS

The following describes the embodiments of the present invention with reference to the accompanying drawings in the embodiments of the present invention.

A resource allocation method in the embodiments of the present invention may be applied to a communications system. Optionally, the communications system may be a D2D system. The communications system includes a first device, a second device, and a third device. The first device may be relay user equipment in the D2D communications system, the second device may be a network device in the D2D communications system, and the third device may be remote user equipment in the D2D communications system.

The network device in the embodiments of the present invention may be an evolved NodeB (Evolutional NodeB, eNB) in a Long Term Evolution (Long Term Evolution, LTE) system or another evolved system, a macro base station, a micro base station (also referred to as a "small cell"), a picocell base station, an access point (Access Point, AP), a transmission point (Transmission Point, TP), or the like. The network device in the embodiments of the present invention may also be a base station in a future network.

The remote user equipment and the relay user equipment in the embodiments of the present invention may be referred to as terminals, or may be referred to as Terminals, mobile stations (Mobile Station, MS), mobile terminals (Mobile Terminal), or the like. For example, the terminals may be mobile phones (or referred to as "cellular" phones), or computers with mobile terminals. For example, the terminals may also be portable, pocket-sized, handheld, computer built-in, or vehicle-mounted mobile apparatuses.

Figure 1:
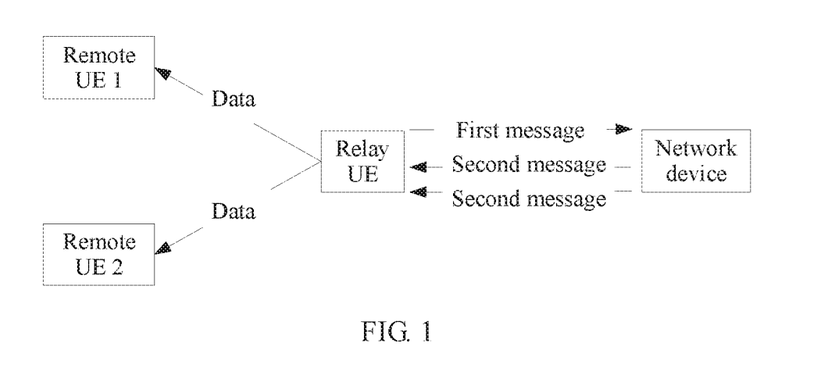
FIG. 1 is an architectural diagram of an optional communications system according to an embodiment of the present invention.

Optionally, the resource allocation method in the embodiments of the present invention may be applied to a UE-to-Network relay scenario in the D2D communications system. D2D communication is a communication mode in which a transmit end directly sends data to a receive end through a sidelink, without a need to forward the data by using an eNB or a cellular network. The UE-to-Network relay scenario is a relatively special mode in the D2D communication mode. As shown in FIG. 1, an embodiment of the present invention provides a system architecture of the UE-to-Network relay scenario. As shown in the figure, the system architecture includes a network device, relay user equipment, and remote user equipments. The remote user equipments connect to the network device by using the relay user equipment, so as to access a network. It should be noted that merely two remote user equipments are shown in FIG. 1, but this does not constitute a limitation on the embodiments of the present invention. The embodiments of the present invention impose no limitation on a quantity of remote user equipments.

In the UE-to-Network relay scenario, there are mainly two purposes of remote user equipment's connection to and data transmission with a network device by using relay user equipment: First, coverage is provided for the remote user equipment. In some cases, the remote user equipment is located outside a network coverage area. To send uplink data to the network device or receive downlink data sent by the network device, the remote user equipment may connect to the network device by using relay user equipment. Second, some remote user equipments feature a small size, a small battery capacity, and low power consumption, for example, a wearable device. To help the wearable device reduce power consumption, the wearable device may be allowed to communicate with the network device by using relay user equipment. The relay user equipment may be an intelligent mobile terminal of a wearer of the wearable device.

Optionally, in the D2D communication, there are two resource allocation manners: autonomous resource selection performed by user equipment and resource allocation scheduled by a base station.

In the manner of autonomous resource selection performed by the user equipment, an eNB configures a resource pool for the UE by using a broadcast message or dedicated signaling, and the UE may autonomously select a resource from the resource pool to transmit sidelink (sidelink) data. If the UE is in a radio resource control (Radio Resource Control, RRC) idle mode, and the base station adds, to the broadcast message, a sending resource pool for sending sidelink data, the UE in the RRC idle mode may use the manner of autonomous resource selection performed by the user equipment. If the user equipment is in an RRC connected mode, and the base station configures, for the UE by using the dedicated signaling, a sending resource pool for sending sidelink data, the UE in the RRC connected mode may use the manner of autonomous resource selection performed by the user equipment.

In the manner of resource allocation scheduled by the base station, UE in an RRC connected mode needs to request a sidelink resource from an eNB for sending sidelink data. The UE requests a resource from the eNB by using a scheduling request (Scheduling Request, SR) or a sidelink buffer status report (sidelink Buffer Status Reporting, BSR), and notifies the eNB of a current buffer state. The base station schedules, by using a sidelink grant, a sidelink resource for the UE to transmit the sidelink data.

In the UE-to-Network relay scenario in the embodiments of the present invention, the relay user equipment in the RRC connected mode uses the manner of resource allocation scheduled by the base station. The relay user equipment establishes connections to a plurality of remote user equipments. The remote user equipments are also in the RRC connected mode. A prior-art solution is as follows: To send sidelink data. to a plurality remote user equipments, relay user equipment sends a sidelink BSR to an eNB to request sidelink resources, the eNB allocates sidelink resources to the relay user equipment by using sidelink grants, and the sidelink resources for different remote user equipments are scheduled by using different sidelink grants. When the relay user equipment receives the sidelink grants, the relay user equipment selects sidelink resources to send the sidelink data to the remote user equipments based on priorities of the sidelink data to be sent to different remote user equipments.

In the prior-art solution, the base station cannot identify the remote user equipments, and does not save contexts of the remote user equipments; the base station does not specifically allocate the sidelink resources based on the remote user equipments; and after obtaining the allocated sidelink resources, the relay user equipment selects the sidelink resources merely based on priorities of logical channels on which the data to be sent to the remote user equipments is located. Consequently, the remote UEs may fail to receive the data sent by the relay user equipment, and a packet loss may occur. For example, if remote user equipment is configured with discontinuous reception (Discontinuous Reception, DRX), a gap (such as a measurement gap measurement gap), or another configuration with a time limit on sidelink data receiving, and the sidelink resource selected by the relay user equipment covers a time segment on which the remote UE cannot receive data, a loss of a data packet may be caused.

To resolve the foregoing problems, the embodiments of the present invention provide a resource allocation method: A first device sends a first message to a second device, the first message may be a BSR, the first message includes first identification information of a third device that can be identified by the second device, and during sidelink resource allocation, the second device may specifically allocate a target sidelink resource based on the first identification information of the third device. For example, the first identification information may be used by the second device to obtain configuration information of the third device identified by the first identification information. The configuration information may be configuration information in a context of the third device, including discontinuous reception configuration information, gap configuration information, tion, or another configuration of the third device with a time limit on sidelink data receiving. A time-frequency location of a resource on which the third device cannot receive data may be determined based on the configuration information. The second device may configure the target sidelink resource based on the configuration information. The target sidelink resource does not include the resource on which the third device cannot receive data. The resource on which the third device cannot receive data means that the third device cannot listen for data on the time-frequency location of the resource. After configuring the target sidelink resource, the second device indicates the target sidelink resource to the first device.

Optionally, when indicating the target sidelink resource to the first device, the second device may indicate second identification information of a third device corresponding to the target sidelink resource, for example, indicate a local identifier (Local ID), a destination address index value, a cell radio network temporary identifier (Cell Radio Network Temporary Identifier, C-RNTI), or the like of the third device. The first device may use, based on the indicated second identification information of the third device, the target sidelink resource allocated to the third device to send the data to the third device.

Optionally, when indicating the target sidelink resource to the relay user equipment, the second device may not indicate second identification information of a third device corresponding to the target sidelink resource. The first device may receive a plurality of target sidelink resources, but the first device does not know a specific third device to which each of the plurality of target sidelink resources corresponds. Therefore, before sending the data to the third device, the first device needs to obtain configuration information of the third device, and select a target sidelink resource based on the configuration information. The target sidelink resource does not include a resource on which the third device cannot receive data.

In the embodiments of the present invention, the first device sends the first message to the second device, and the first identification information included in the first message is an identifier that can be identified by the second device, so that the second device can specifically allocate, based on the third device identified by the first identification information, the target sidelink resource for the first device to send data to the third device. The first device uses the target sidelink resource to send the data, and this can ensure that the third device can receive the sent data, thereby preventing a loss of a data packet.

It should be noted that, the first device may be the relay user equipment in the D2D communications system, the second device may be the network device in the D2D communications system, and the third device may be the remote user equipment in the D2D communications system.

Figure 2:
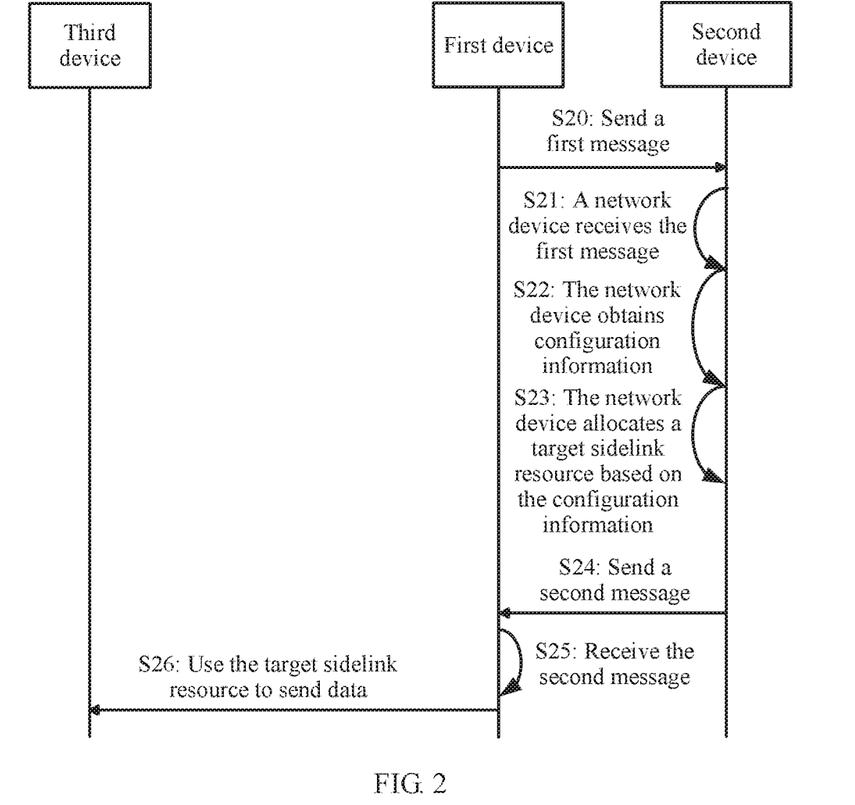
FIG. 2 is an interaction diagram of a resource allocation method according to an embodiment of the present invention.

FIG. 2 is an interaction diagram of a resource allocation method according to an embodiment of the present invention. As shown in the figure, the resource allocation method in this embodiment of the present invention includes but is not limited to the following steps.

S20: The first device sends a first message to a second device, where the first message is used to request a sidelink resource for the first device to send data to a third device, and the first message includes first identification information of the third device.

In an embodiment, when the first device needs to send the data to the third device, the first device sends the first message to the second device. The first message is used to request a sidelink resource for the first device to send the data to the third device. The first message includes the first identification information of the third device. The first identification information is an identifier of a third device that can be identified by the second device. The first identification information carried in the first message is used by the second device to determine configuration information of the third device identified by the first identification information, so that the second device may allocate a target sidelink resource for the third device based on the configuration information of the third device.

Optionally, the first identification information may be a local identifier of the third device. The second device saves a mapping relationship between the local identifier and a cell radio network temporary identifier. In other words, the second device may find a corresponding cell radio network temporary identifier based on a local identifier, so as to identify a third device corresponding to the local identifier. Alternatively, a mapping relationship between a proximity service user equipment identifier (ProSe UE ID) of the third device and each of the local identifier or a cell radio network temporary identifier of the third device is saved on a second device side. The first identification information may alternatively be a destination address index value. The destination address index value indicates a specific identifier in a destination address information table. In other words, the second device may find a corresponding proximity service user equipment identifier based on a destination address index value, and then map a corresponding local identifier or cell radio network temporary identifier, so that the second device can identify a specific third device based on the destination address index value. Alternatively, the second device receives and stores an information table. The information table includes a local identifier list of the third device or a cell radio network temporary identifier list of the third device. The first identification information may alternatively be a destination address index value. In other words, the second device may find a corresponding local identifier or cell radio network temporary identifier based on the destination address index value, so as to identify a third device corresponding to the destination address index value. It should be noted that the information table may be set separately, or content of the information table may be merged into a destination address information table. The destination address index value indicates a specific identifier in the information table. Before sending the first message to the second device, the first device sends the information table to the second device.

Optionally, the first message may be a sidelink BSR. The first message may be in a new media access control control element (Media Access Control Control Element, MAC CE) format designed for a sidelink BSR. The MAC CE format includes first identification information of the third device that can be identified by the second device, for example, a local identifier local ID. Further, optionally, for the introduced new MAC CE format for a sidelink BSR, a new logical channel identifier value (LCID value) is allocated.

The following provides three optional MAC CE formats for a sidelink BSR. That the first identification information of the third device is the local identifier of the third device is used herein as an example for description. It should be noted that the following three solutions are merely examples for the description, and do not constitute a limitation on the embodiments of the present invention.

Figure 3A:
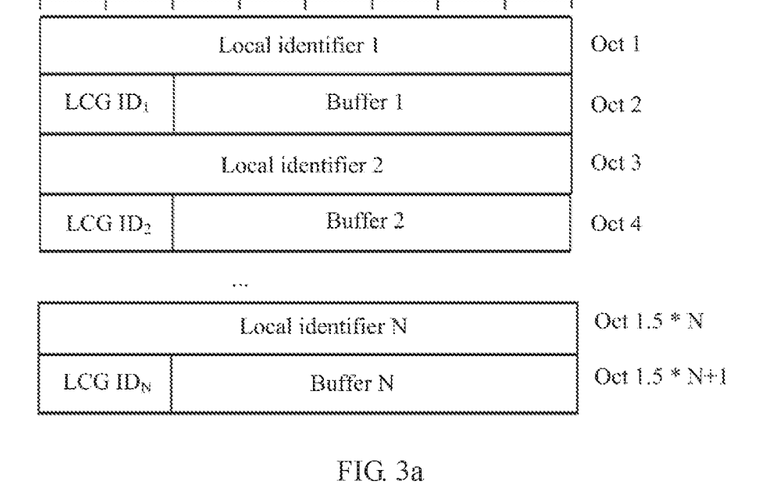
FIG. 3a is a structural diagram of a first message according to an embodiment of the present invention.

Solution 1: It is assumed that a bit quantity of the local identifier local ID is 8. The designed MAC CE format for a sidelink BSR is shown in FIG. 3a. A local identifier local ID field is immediately followed by a field used to indicate a logical channel group identifier LCG ID and a field used to indicate a data buffer size of the logical channel group. When a local ID has data on a plurality of logical channel groups, the local ID field needs to be repeated a plurality of times. Optionally, FIG. 3a may be based on a priority order of logical channel groups, that is, a logical channel group that has a highest-priority logical channel with buffered data is sorted first. This solution causes relatively low overheads for a case in which only one or two logical channel groups of the third device have data, but relatively high overheads for a case in which a plurality of logical channel groups of the third device have data.

Figure 3B:
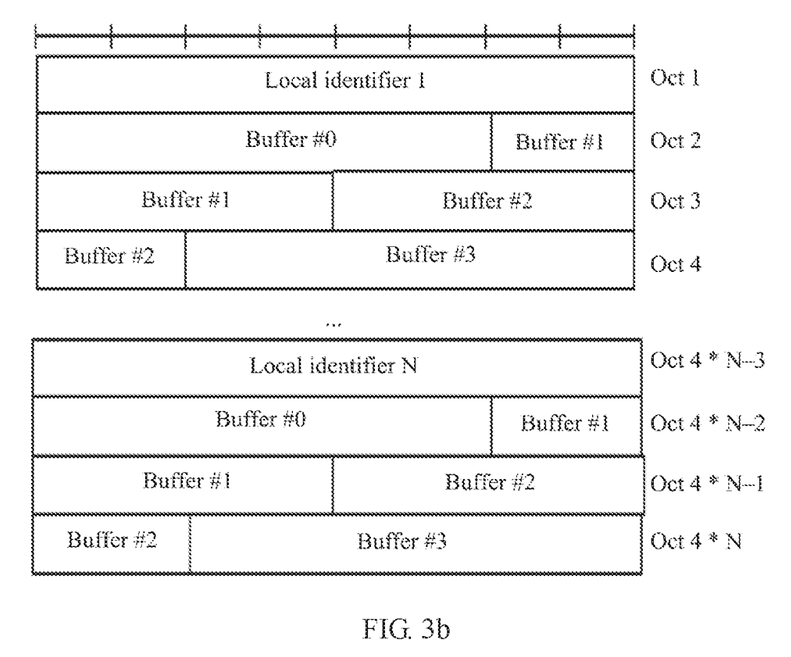
FIG. 3b is a structural diagram of another first message according to an embodiment of the present invention.

Solution 2: If is assumed that a bit quantity of the local identifier local ID is 8. The designed MAC CE format for a sidelink BSR is shown in FIG. 3b. To be specific, a local identifier local ID field is immediately followed by four fields used to indicate data buffer sizes. The four data buffer sizes are respectively corresponding to data buffer sizes of four logical channel groups corresponding to the local ID. This solution causes relatively high overheads for a case in which only one or two logical channel groups of the third device have buffered data, but relatively low overheads for a case in which a plurality of logical channel groups of the third device have buffered data.

Figure 3C:
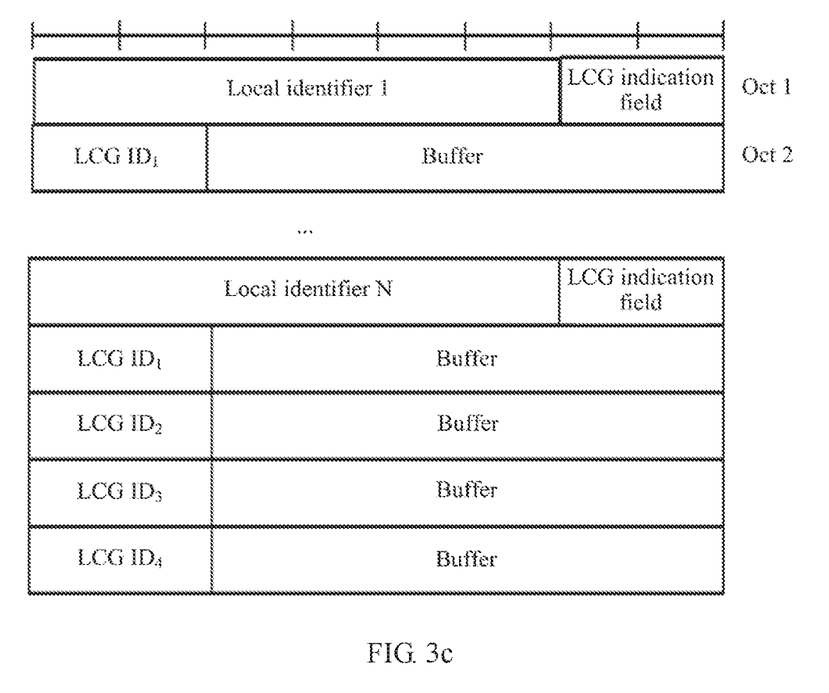
FIG. 3c is a structural diagram of still another first message according to an embodiment of the present invention.

Solution 3: It is assumed that a bit quantity of the local identifier local ID is 6. The designed MAC CE format for a sidelink BSR is shown in FIG. 3c. To be specific, a local ID field corresponds to one indication field LCG indication. The indication field is used to indicate a quantity of logical channel groups corresponding to the local ID, that is, is used to indicate how many logical channel groups having buffered data in a case of the local ID. Optionally, the indication field may occupy 2 bits. This solution is more flexible, and can avoid a waste of resources to a greatest extent.

The following table lists correspondences between values of the indication field and logical channel groups:

| LCG indication | 00 | 01 | 10 | 11 |
| --- | --- | --- | --- | --- |
| Number of LCGs | 1 LCG | 2 LCGs | 3 LCGs | 4 LCGs |

With the design of the new MAC CE format for a sidelink BSR, the following problem in an existing solution can be resolved: In a MAC CE of a sidelink BSR, a length of a field used to indicate a destination address index value is insufficient to represent all third devices. The second device may alternatively identify a specific third device based on the first identification information, so as to allocate a resource in a more targeted way.

S21: The second device receives the first message sent by the first device.

S22: The second device obtains configuration information of the third device identified by the first identification information.

In an embodiment, the first identification information of the third device may be a local identifier or a destination address index value of the third device.

Optionally, if the first identification information is the local identifier, when obtaining configuration information of the third device identified by the first identification information, the second device may determine a cell radio network temporary identifier associated with the local identifier. The cell radio network temporary identifier is used by the second device to identify the third device. The second device stores a relationship between the cell radio network temporary identifier and the configuration information of the third device.

Optionally, if the first identification information is the destination address index value of the third device, when obtaining configuration information of the third device identified by the first identification information, the second device first determines a cell radio network temporary identifier associated with the destination address index value, where the cell radio network temporary identifier is used by the second device to identify the third device; and the second device obtains configuration information corresponding to the cell radio network temporary identifier. It should be noted that if the first identification information is the destination address index value of the third device, the second device needs to pre-save a correspondence between a proximity service user equipment identifier of the third device and either the local identifier of the third device or a cell radio network temporary identifier of the third device. Therefore, the second device may determine the cell radio network temporary identifier associated with the destination address index value, so as to obtain the configuration information corresponding to the cell radio network temporary identifier. Alternatively, the second device receives an information table sent by the first device. The information table includes a local identifier list of the third device or a cell radio network temporary identifier list of the third device. Therefore, the second device may determine the local identifier or the cell radio network temporary identifier associated with the destination address index value, so as to obtain the configuration information corresponding to the cell radio network temporary identifier.

S23: The second device allocates a target sidelink resource based on the configuration information.

In an embodiment, after obtaining the configuration information of the third device identified by the first identification information, the second device may further allocate a target sidelink resource based on the configuration information. The configuration information may be configuration information in a context of the third device, including discontinuous reception configuration information, gap configuration information, or another configuration of the third device with a time limit on sidelink data receiving. A time-frequency location of a resource on which the third device cannot receive data may be determined based on the configuration information. The time-frequency location of the resource on which the third device cannot receive data may mean that the third device cannot listen for data on the time-frequency location of the resource.

The second device may allocate the target sidelink resource based on the configuration information of the third device. The target sidelink resource is used by the first device to send sidelink data to the first device. The target sidelink resource does not include the resource on which the third device cannot receive data. In this way, the second device specifically allocates the target sidelink resource based on the configuration information of the third device, and this can avoid the third device from failing to receive data sent by the first device.

S24: The second device sends a second message to the first device, where the second message is used to indicate the target sidelink resource for the first device to send the data to the third device.

In an embodiment, the second device sends the second message to the first device. The second message is used to indicate the target sidelink resource for the first device to send the data to the third device. The second message may include second identification information of the third device, or may not include the second identification information of the third device. It should be noted that, if the second message does not include the second identification information of the third device, before sending the data to the third device, the first device needs to select the target sidelink resource based on the configuration information of the third device, to avoid the third device from failing to receive the sent data. For specific details, refer to a description on the case in with the second message does not include the second identification information of the third device in step 26. Details are not described herein again.

Optionally, the second message includes the second identification information of the third device, that is, the second device indicates to the first device a specific third device to which the allocated target sidelink resource specifically corresponds. Optionally, the second message may include the local identifier of the third device or the destination address index value of the third device. Alternatively, the second message is downlink control information (Downlink Control Information, DCI) scrambled by using the cell radio network temporary identifier of the third. device.

Optionally, the second message is the DCI. The second device adds the second identification information of the third device into the DCI, for example, the local identifier or the destination address index value. The first device knows, by using the second identification information of the third device that is indicated in the DCI, to use the target sidelink resource to send the sidelink data of the corresponding third device.

It should be noted that if the second identification information of the third device is the destination address index value, in a possible implementation, a mapping relationship between the proximity service user equipment identifier of the third device and either the cell radio network temporary identifier or the local identifier of the third device needs to be maintained on the second device side. The destination address index value indicates a specific identifier in the destination address information table. In another possible implementation, the destination address information table needs to be changed. The first device may set an information table in the destination address information table. The information table includes the local identifier list of the third device or the cell radio network temporary identifier list of the third device. The first device sends the changed destination address information table to the second device. Alternatively, an information table is set separately. The information table includes the local identifier list of the third device or the cell radio network temporary identifier list of the third device. The first device sends the information table to the second device. The destination address index value indicates a specific identifier in the information table.

Optionally, when indicating to the first device the specific third device to which the allocated target sidelink resource specifically corresponds, the second device may use the cell radio network temporary identifier specific to the third device to scramble the DCI. The first device descrambles received DCI by using cell radio network temporary identifiers corresponding to different third devices. A third device corresponding to a cell radio network temporary identifier that enables successful descrambling is the third device corresponding to the target sidelink resource. It should be noted that the second device needs to notify the first device of cell radio network temporary identifiers corresponding to third devices in advance by using dedicated signaling.

S25: The first device receives the second message sent by the second device, where the second message is used to indicate the target sidelink resource for the first device to send the data to the third device.

S26: The first device uses the target sidelink resource to send the data to the third device.

In an embodiment, after receiving the second message sent by the second device, the first device parses the second message, and obtains the target sidelink resource indicated by the second message. Optionally, the second message may include second identification information of the third device corresponding to the allocated target sidelink resource, or the second message may not include the second identification information of the third device corresponding to the allocated target sidelink resource.

Optionally, if the second message includes the second identification information of the third device corresponding to the allocated target sidelink resource, the first device may directly use the target sidelink resource to send the data to the third device identified by the second identification information.

Optionally, if the second message does not include the second identification information of the third device corresponding to the allocated target sidelink resource, before sending the data to the third device, the first device further needs to obtain the configuration information of the third device; and further, the first device uses, based on the configuration information of the third device, the target sidelink resource on which the third device is capable of listing, to send the data to the third device.

Optionally, the first device obtains the configuration information of the third device (for example, a DRX configuration, a gap configuration, or another configuration with a time limit on sidelink data receiving) from the second device. When selecting a sidelink resource to send sidelink data, the first device needs to add a new determining step to a process of performing logical channel processing, to determine whether the selected sidelink resource is within a receiving-allowed time segment of a corresponding third device.

Specifically, optionally, in all logical channels that have sidelink data to be transmitted, the first device selects a proximity service destination (ProSe Destination) corresponding to a logical channel with a highest priority. The first device determines, based on configuration information (for example, a DRX configuration, a gap configuration, or another configuration with a time limit on sidelink data receiving) of a third device corresponding to the proximity service destination, whether the third device corresponding to the proximity service destination can detect sidelink data if the selected sidelink resource is used to send the sidelink data. If the third device cannot detect the sidelink data, the first device selects a proximity service destination corresponding to a logical channel with a second highest priority. Therefore, it is ensured that the selected sidelink resource can satisfy a configuration limitation of the third device, and it is ensured that data on a logical channel with a higher priority is sent earlier. During subsequent data encapsulation, data on the logical channel with the highest priority of the third device corresponding to the proximity service destination may be encapsulated. If there is a remaining resource, data on a logical channel with a lower priority of the third device corresponding to the proximity service destination is encapsulated, and so on.

This manner can ensure that the sidelink resource used by the first device can satisfy the configuration limitation of the third device, ensure that data on a logical channel with a higher priority is sent earlier, and avoid allocation of a time-frequency resource to a third device that cannot receive the resource.

Optionally, the first device obtains the configuration information of the third device (for example, a DRX configuration, a gap configuration, or another configuration with a time limit on sidelink data receiving) from the second device. When selecting a sidelink resource to send sidelink data, the third device does not use a logical channel priority-based processing process that uses a proximity service per-packet priority (ProSe Per-Packet Priority, PPPP), but uses a logical channel priority-based processing process that uses a token bucket algorithm.

Specifically, optionally, the use of the logical channel priority-based processing process that uses the token bucket algorithm is a processing process for a plurality of logical channels of a third device. A third device selection process needs to be added based on the token bucket algorithm. To be specific, a new step is added before a step of executing the token bucket algorithm: From all logical channels with Bj>0, a third device corresponding to a logical channel with a highest priority is selected; and if the third device cannot detect data sent on the used sidelink resource due to a limitation on a configuration (for example, a DRX configuration or a gap configuration), in the current transmission time interval (transmission time interval, TTI), it is considered that Bj=0. However, an actual computing process of Bj is unchanged, that is, in a TTI after the current TTI, a value of Bj is restored to an original value, and computing continues. Bj is used to indicate a quantity of tokens in a token bucket corresponding to the logical channel.

This manner uses the logical channel priority-based processing process that uses the token bucket algorithm, and further considers a guaranteed bit rate (Prioritized Bit Rate, PBR) on a premise that a priority is ensured, so as to achieve fairness among different logical channels of every third device, and to some extent achieve fairness of scheduling among third devices.

In the embodiments of the present invention, the first device sends the first message to the second device, and the first identification information included in the first message is an identifier that can be identified by the second device, so that the second device can specifically allocate, based on the third device identified by the first identification information, the target sidelink resource for the first device to send data to the third device. The first device uses the target sidelink resource to send the data, and this can ensure that the third device can receive the sent data, thereby preventing a loss of a data packet.

Figure 4A:
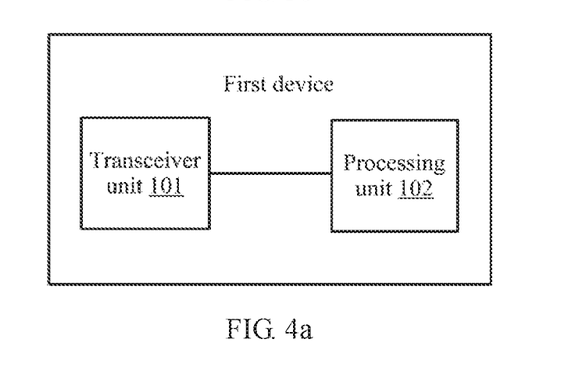
FIG. 4a is a schematic structural diagram of a first device according to an embodiment of the present invention.
Figure 4B:
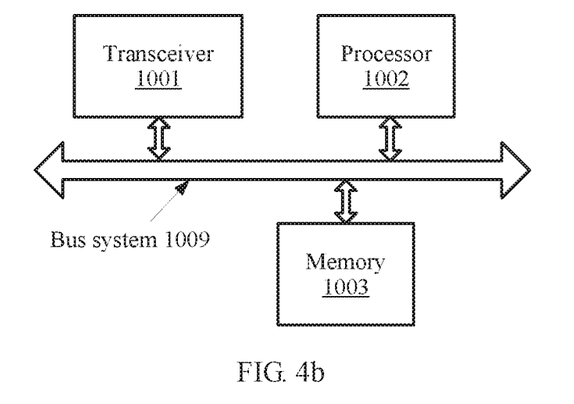
FIG. 4b is a schematic structural diagram of another first device according to an embodiment of the present invention.

FIG. 4a and FIG. 4b are schematic structural diagrams of a first device according to embodiments of the present invention. As shown in FIG.: 4a, the first device may include a transceiver unit 101 and a processing unit 102.

The transceiver unit 101 may be configured to perform a receiving action or a sending action performed by the first device described in the method in FIG. 2.

The processing unit 102 may be configured to perform corresponding processing described in the method in FIG. 2 on information received by the transceiver unit 101.

The transceiver unit 101 may be implemented by using a transceiver 1001 in FIG. 4b. The processing unit 102 may be implemented by using a processor 1002, or implemented by using the processor 1002 and a memory 1003.

For specific details, refer to the descriptions in the method in FIG. 3. Details are not described herein again.

For example, the transceiver unit 101 is configured to send a first message to a second device. The first message is used to request a sidelink resource for the first device to send data to a third device, and the first message includes first identification information of the third device.

The processing unit 102 is configured to receive a second message sent by the second device. The second message is used to indicate a target sidelink resource for the first device to send the data to the third device.

The transceiver unit 101 is further configured to use the target sidelink resource to send the data to the third device.

Correspondingly, as shown in FIG. 4b, the first device may include the transceiver 1001 and the processor 1002. The processor 1002 is configured to control an operation of the first device, including transmitting (including receiving and/or sending) information by using the transceiver 1001. Further, the first device may include the memory 1003. The memory 1003 may include a read-only memory and a random access memory, and is configured to provide an instruction and data for the processor 1002. The memory 1003 may be integrated into the processor 1002, or may be independent of the processor 1002. A part of the memory 1003 may further include a non-volatile random access memory (NVRAM). Components of the user device are coupled together by using a bus system. In addition to a data bus, the bus system 1009 further includes a power bus, a control bus, and a status signal bus. However, for clear description, various types of buses in the figure are marked as the bus system 1009.

The processes of the first device disclosed in the embodiment in FIG. 2 of this application may be applied to the processor 1002, or implemented by the processor 1002. In an implementation process, steps of the processes implemented by the first device may be completed by using a hardware integrated logical circuit in the processor 1002, or by using instructions in a form of software. The processor 1002 may be a general purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The universal processor may be a microprocessor or any conventional processor or the like. The steps of the method disclosed with reference to the embodiments of this application may be directly performed and completed by a hardware processor, or may be performed and completed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory 1003. The processor 1002 reads information in the memory 1003, and completes, in combination with hardware of the processor, the steps in the processes indicated by the first device in FIG. 2 in the embodiments of the present invention.

For example, the transceiver 1001 is configured to send a first message to a second device. The first message is used to request a sidelink resource for the first device to send data to a third device, and the first message includes first identification information of the third device.

The processor 1002 is configured to receive a second message sent by the second device. The second message is used to indicate a target sidelink resource for the first device to send the data to the third device.

The transceiver 1001 is further configured to use the target sidelink resource to send the data to the third device.

Further, the first device may further include an input device such as a keyboard, an output device such as a display screen, and another structure. Details are not described herein.

Based on a same technical concept, an embodiment of the present invention further provides a second device. The second device may be the second device described in the method in FIG. 2, and more specifically, may be a transmission point such as a base station, or may be a device that can implement a corresponding function of the second device described in the foregoing method.

Figure 5A:
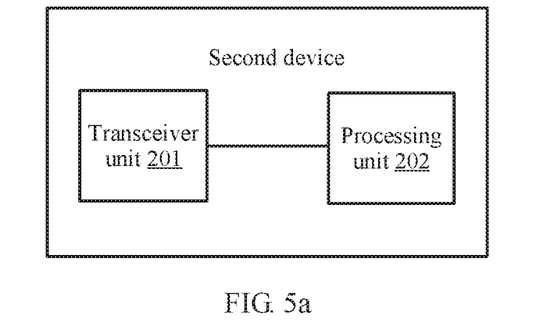
FIG. 5a is a schematic structural diagram of a second device according to an embodiment of the present invention.
Figure 5B:
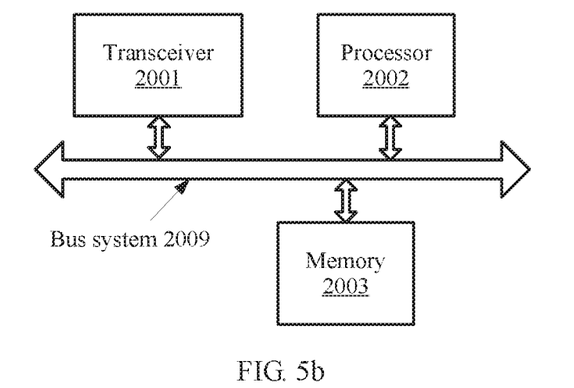
FIG. 5b is a schematic structural diagram of another second device according to an embodiment of the present invention.

FIG. 5a and FIG. 5b are schematic structural diagrams of the second device according to embodiments of the present invention. As shown in FIG. 5a, the second device may include a transceiver unit 201 and a processing unit 202.

The transceiver unit 201 may be configured to perform a sending action or a receiving action performed by the second device described in the method in FIG. 2.

The processing unit 202 may be configured to perform corresponding processing described in the method in FIG. 2 on information received by the transceiver unit 201, and send information by using the transceiver unit 201.

The transceiver unit 201 may be implemented by using a transceiver 2001 in FIG. 12b. The processing unit 202 may be implemented by using a processor 2002, or implemented by using the processor 2002 and a memory 2003.

For specific details, refer to the descriptions in the foregoing method. Details are not described herein again.

For example, the transceiver unit 201 is configured to receive a first message sent by a first device. The first message is used to request allocation of a sidelink resource for the first device to send data to a third device, and the first message includes first identification information of the third device.

The transceiver unit 201 is further configured to send a second message to the first device. The second message is used to indicate a target sidelink resource for the first device to send the data to the third device. The target sidelink resource is a resource allocated to the third device based on the first identification information.

Correspondingly, as shown in FIG. 4b, the second device may include the transceiver 2001, the processor 2002, and the memory 2003.

The processor 2002 is configured to control an operation of the second device, including transmitting (including receiving and/or sending) data by using the transceiver 2001. The memory 2003 may include a read-only memory and a random access memory, and is configured to provide an instruction and data for the processor 2002. A part of the memory 2003 may further include a non-volatile random access memory (NVRAM). Components of the second device are coupled together by using a bus system. In addition to a data bus, the bus system 2009 further includes a power bus, a control bus, and a status signal bus. However, for clear description, various types of buses in the figure are marked as the bus system 2009.

The processes disclosed in the embodiments of this application may be applied to the processor 2002, or implemented by the processor 2002. In an implementation process, steps of the processes implemented by the second device may be completed by using a hardware integrated logical circuit in the processor 2002, or by using instructions in a form of software. The processor 2002 may be a general purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed on the second device side in FIG. 2 in the embodiments of this application. The universal processor may be a microprocessor or any conventional processor or the like. The steps of the method disclosed with reference to the second device side in FIG. 2 in the embodiments of this application may be directly performed and completed by a hardware processor, or may be performed and completed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory 2003, and the processor 2002 reads information in the memory 2003 and completes, in combination with hardware of the processor, the steps in the processes indicated in the embodiments of the present invention.

For example, the transceiver 2001 is configured to receive a first message sent by a first device. The first message is used to request allocation of a sidelink resource for the first device to send data to a third device, and the first message includes first identification information of the third device.

The transceiver 2001 is further configured to send a second message to the first device. The second message is used to indicate a target sidelink resource for the first device to send the data to the third device. The target sidelink resource is a resource allocated to the third device based on the first identification information.

Further, optionally, the second device may further include a communications interface module, configured to communicate with another base station or another network element, for example, a core network element.

An embodiment of this application further provides a system, including the foregoing first device (FIG. 4a or FIG. 4b) and the second device (FIG. 5a or FIG. 5b). The system may be a communications system, or may be another system.

A person of ordinary skill in the art may understand that all or some of the processes of the methods in the embodiments may be implemented by a computer program instructing related hardware. The program may be stored in a computer readable storage medium. When the program runs, the processes of the methods in the embodiments are performed. The foregoing storage medium includes: any medium that can store program code, such as a ROM, a RAM, a magnetic disk, or an optical disc.

What is claimed is:

1. A method implemented by a first user equipment (UE), wherein the method comprises:
   sending a first message to a network device for requesting a sidelink resource used for transmissions between UEs, wherein the first message comprises an identification of a second UE;
   receiving a second message from the network device, wherein the second message comprises information indicating a target sidelink resource;
   determining whether the target sidelink resource is within a receiving-allowed time segment of the second UE according to a configuration of discontinuous reception (DRX) and/or a gap configuration of the second UE; and
   transmitting data to the second UE using the target sidelink resource, when determining that the target sidelink resource is within the receiving-allowed time segment of the second UE, and wherein the target sidelink resource is capable of being listened to by the second UE.

2. The method of claim 1, wherein the configuration of the second UE is obtained from the network device.

3. The method of claim 1, wherein the identification of the second UE comprises a local identifier of the second UE or a destination address index value of the second UE.

4. The method of claim 1, wherein determining whether the target sidelink resource is within a receiving-allowed time segment of the second UE further comprises:
   determining that the target sidelink resource is within a receiving-allowed time segment of the second UE; and
   determining that the second UE has a logical channel with a highest priority.

5. The method of claim 1, wherein determining whether the target sidelink resource is within a receiving-allowed time segment of the second UE further comprises determining the second UE, wherein the target sidelink resource is capable of being listened by the second UE, and the second UE has a logical channel with a highest priority.

6. The method of claim 1, wherein the identification of the second UE comprises an indication of a resource on which the second UE cannot receive data.

7. First user equipment (UE), comprising:
   a transceiver configured for messaging;
   a memory coupled to the transceiver and configured to store instructions; and
   a processor configured to execute the instructions stored in the memory, wherein when the processor executes the instruction stored in the memory, the first UE is configured to cause the transceiver to:
   send a first message to a network device for requesting a sidelink resource used for transmissions between terminals, wherein the first message comprises an identification of a second UE;
   receive a second message from the network device, wherein the second message comprises information indicating a target sidelink resource;
   determine whether the target sidelink resource is within a receiving-allowed time segment of the second UE according to a configuration of discontinuous reception (DRX) and/or a gap configuration of the second UE; and
   transmit data to the second UE, using the target sidelink resource, when the target sidelink resource is within the receiving-allowed time segment of the second UE, and wherein the target sidelink resource is capable of being listened to by the second UE.

8. The first UE of claim 7, wherein the configuration of the second UE is obtained from the network device.

9. The first UE of claim 7, wherein the identification of the second UE comprises a local identifier of the second UE or a destination address index value of the second UE.

10. The first UE of claim 7, wherein determining whether the target sidelink resource is within a receiving-allowed time segment of the second UE further comprises: determining that the target sidelink resource is within a receiving-allowed time segment of the second UE; and determining that the second UE has a logical channel with a highest priority.

11. The first UE of claim 7, wherein determining whether the target sidelink resource is within a receiving-allowed time segment of the second UE further comprises determining the second UE, wherein the target sidelink resource is capable of being listened by the second UE, and the second UE has a logical channel with a highest priority.

12. A computer program product comprising computer-executable instructions stored on a non-transitory computer-readable medium that, when executed by a processor, cause first user equipment (UE) to:
- send a first message to a network device for requesting a sidelink resource used for transmissions between terminals, wherein the first message comprises an identification of a second UE;
- receive a second message from the network device, wherein the second message comprises information indicating a target sidelink resource;
- determine whether the target sidelink resource is within a receiving-allowed time segment of the second UE according to a configuration of discontinuous reception (DRX) and/or a gap configuration of the second UE; and
- transmit data to the second UE using the target sidelink resource, when the target sidelink resource is within the receiving-allowed time segment of the second UE, and wherein the target sidelink resource is capable of being listened to by the second UE.

13. The computer program product of claim 12, wherein the identification of the second UE comprises a local identifier of the second UE or a destination address index value of the second UE.

14. The computer program product of claim 12, wherein determining whether the target sidelink resource is within a receiving-allowed time segment of the second UE further comprises: determining that the target sidelink resource is within a receiving-allowed time segment of the second UE; and determining that the second UE has a logical channel with a highest priority.

15. The computer program product of claim 12, wherein the configuration of the second UE is obtained from the network device.

16. The computer program product of claim 12, wherein determining whether the target sidelink resource is within a receiving-allowed time segment of the second UE further comprises determining the second UE, wherein the target sidelink resource is capable of being listened by the second UE, and the second UE has a logical channel with a highest priority.

17. The computer program product of claim 12, wherein the identification of the second UE comprises an indication of a resource on which the second UE cannot receive data.

* * * * *